(12) United States Patent
Kanekar et al.

(10) Patent No.: US 7,903,647 B2
(45) Date of Patent: Mar. 8, 2011

(54) EXTENDING SSO FOR DHCP SNOOPING TO TWO BOX REDUNDANCY

(75) Inventors: Bhushan Mangesh Kanekar, San Jose, CA (US); Marco Eligio Foschiano, Pinerolo (IT)

(73) Assignee: Cisco Technology, Inc., San Jose, CA (US)

( * ) Notice: Subject to any disclaimer, the term of this patent is extended or adjusted under 35 U.S.C. 154(b) by 703 days.

(21) Appl. No.: 11/289,799

(22) Filed: Nov. 29, 2005

(65) Prior Publication Data

US 2007/0121617 A1 May 31, 2007

(51) Int. Cl.
*H04L 12/28* (2006.01)
*H04L 12/16* (2006.01)
*H04Q 11/00* (2006.01)
*G06F 15/173* (2006.01)

(52) U.S. Cl. .......... 370/389; 370/255; 370/270; 709/224
(58) Field of Classification Search .................. 370/255, 370/270, 389; 709/224
See application file for complete search history.

(56) References Cited

U.S. PATENT DOCUMENTS

| | | | |
|---|---|---|---|
| 6,487,605 B1 | 11/2002 | Leung et al. | |
| 6,751,191 B1 | 6/2004 | Kanekar et al. | |
| 7,080,151 B1 * | 7/2006 | Borella et al. | 709/230 |
| 7,379,423 B1 * | 5/2008 | Caves et al. | 370/232 |
| 2002/0080752 A1 * | 6/2002 | Johansson et al. | 370/338 |
| 2005/0007951 A1 * | 1/2005 | Lapuh et al. | 370/225 |
| 2005/0243837 A1 | 11/2005 | Boyd et al. | |
| 2006/0036733 A1 * | 2/2006 | Fujimoto et al. | 709/225 |
| 2006/0143440 A1 * | 6/2006 | Ponnapalli et al. | 713/155 |
| 2006/0198296 A1 * | 9/2006 | Majee et al. | 370/216 |
| 2006/0248229 A1 * | 11/2006 | Saunderson et al. | 709/245 |
| 2007/0104146 A1 * | 5/2007 | Hossain et al. | 370/331 |

OTHER PUBLICATIONS

"Route Processor Redundancy Paul (RPR+)," 2004, Cisco Systems, Inc., pp. 1-13.
Li, T. et al., "Cisco Hot Standby Router Protocol (HSRP)," RFC 2281, Mar. 1998, pp. 1-15.
International Search Report dated Sep. 25, 2007, received in corresponding PCT Application No. PCT/US06/45762 (3 pgs.).
Written Opinion dated Sep. 25, 2007, received in corresponding PCT Application No. PCT/US06/45762 (6 pgs.).

* cited by examiner

*Primary Examiner* — Pankaj Kumar
*Assistant Examiner* — Lonnie Sweet
(74) *Attorney, Agent, or Firm* — Weaver Austin Villeneuve & Sampson LLP

(57) ABSTRACT

Disclosed are mechanisms for facilitating the use of DHCP (dynamic host configuration protocol) binding data. In general, certain applications include mechanisms for intercepting data being sent from a node and then determining whether the data corresponds to a valid IP address and MAC address binding. Embodiments of the present invention provide mechanisms for sharing such DHCP binding data between routers (or other type of network devices) in a redundancy group so that any of the routers may take over the data inspection to validate DHCP bindings. In particular aspects of the invention, the DHCP binding data is validated in procedures related to DHCP snooping, dynamic ARP (address resolution protocol) inspection, and the like.

24 Claims, 6 Drawing Sheets

500a

| | 502a | 504a | 506a | 508a | 510a |
|---|---|---|---|---|---|
| | IP Address | MAC Address | Interface ID | Locally Learned? | Age |
| 510a → | c | C | red | yes | current |
| 512a → | d | D | green | no | current |

DHCP Snooping
Database of Router 306a

| | 502b | 504b | 506b | 508b | 510b |
|---|---|---|---|---|---|
| | IP Address | MAC Address | Interface ID | Locally Learned? | Age |
| 510b → | c | C | red | no | current |
| 512b → | d | D | green | yes | current |

DHCP Snooping
Database of Router 306b

Figure 5B

EXTENDING SSO FOR DHCP SNOOPING TO TWO BOX REDUNDANCY

BACKGROUND OF THE INVENTION

The present invention relates generally to computer network systems using a redundant router group. More particularly, it relates to mechanisms for facilitating DHCP (dynamic host configuration protocol) snooping, and the like, after failure in such a redundancy router group.

FIG. 1 is a diagrammatic representation of an example enterprise system 100. As shown, the enterprise system 100 includes a plurality of access layer switches 104 that are each coupled to one or more end hosts. For instance, access switch 104a is coupled to computer system 102a and IP phone 102b. Typically, each access switch provides layer 2 bridging for a plurality of hosts (not shown for each switch). The access switches 104 are typically coupled to two or more distribution layer routers and switches 106. Each distribution layer router/switch 106 may provide layer 3 routing, as well as layer 2 bridging. These distribution layer routers/switches 106 are together coupled with a core router/switch 108, which may be coupled with a data center 114 and a wide area network, such as the Internet, 110 via an edge router 112.

The individual components on each layer of the enterprise system 100 may be distributed in any suitable manner. For example, a particular company may include an access layer switch on each floor, one distribution switch/router in each building, and a single core router/switch for each campus or enterprise entity. In another application, such as a service provider environment, each access switch may serve a particular neighborhood or block; each distribution router/switch may serve a particular subdivision or city; while the core router/switch serves an entire city or metro area.

To facilitate discussion, an example communication scenario between two hosts via routers without implementation of a redundancy protocol, such as HSRP (Hot Standby Router Protocol) or VRRP (Virtual Router Redundancy Protocol) or GLBP (Gateway Load Balancing Protocol), will first be described. FIG. 2 represents a network segment 200 in which a first host 202a in a first VLAN 1 (virtual local area network) is used to communicate with a second host 202b in a second VLAN 2. A host typically first communicates with its next routing hop or gateway. For example, host 202a may send data first to its gateway, which may be in the form of its distribution router 206a. The host may be aware of its gateway by implementing a routing protocol, such as RIP (routing information protocol). However, use of a routing protocol is typically time consuming (e.g., to build the routing tables via routing discovery mechanisms), complex (e.g., to account for multiple changes in host configuration over time), and resource intensive (e.g., requiring large routing tables). Thus, another way to make a host aware of its gateway is to statically configure the host with a specific gateway's IP address. In the illustrated example, host 202a is statically configured to communicate with IP address "a" of gateway 206a. The host 202a then uses this IP address "a" to send a request to gateway 206a for the corresponding MAC address "A" of gateway 206a.

The host 202a then uses the obtained MAC address "A" of gateway 206a to send data through its gateway 206a to another host, e.g., host 202b. For instance, traffic being sent from host 202a to host 202b will contain the following header information:

TABLE 1

MAC and IP address information for traffic sent from hosts 202a to 202b

| MAC destination | MAC source | IP Destination | IP Source |
|---|---|---|---|
| A | C | d | c |

Unfortunately, if the gateway 206a fails, all of its underlying hosts need to be reconfigured. In the example of FIG. 2, all of the hosts that used default gateway 206a need to be reconfigured to use gateway 206b. This reconfiguration process can require significant amounts of time and temporary disruption in communication between a new gateway and a particular host can occur prior to reconfiguration of the particular host. That is, if host 202a is not reconfigured, its traffic to host 202b will include the MAC address "A" for a failing gateway 206a.

The router redundancy protocols HSRP, VRRP and GLBP were implemented to overcome such problems with failing gateway routers to thereby minimize traffic disruptions between end hosts. These protocols require each host to be configured with a set of virtual IP and MAC addresses that correspond to the currently active router in its redundant router or gateway group and for the redundancy routers to communicate with each other, for example, via HSRP/VRRP/GLBP messages 207. For example, host 202a may be preconfigured with IP address h and MAC address "H" that both represent the currently active gateway from the redundant router group that includes routers 206a and 206b. Specifically, routers 206a and 206b will establish which one of them will be the active router and such active router takes on the IP and MAC addresses "h" and "H", respectively. Router 206a may initially serve as the active router for host 202a and be reachable by IP address "h" and MAC address "H". When router 206a fails, standby router 206b then detects this failure via HSRP/VRRP/GLBP messages 207 (or, rather, lack of lack of messages) and then takes over as active router and is reachable by IP address "h" and MAC address "H".

Although conventional redundancy protocols work well for most applications, problems may occur under certain applications. For example, the DHCP snooping protocol allows a mobile host to connect with a particular gateway and have its IP address dynamically assigned by a DHCP server. The reason for this is that the host's IP address must fit in with the current gateway's IP subnet addressing scheme. At a high level, when a host first connects to a particular gateway, it requests an IP address be assigned for its particular MAC address. This request is sent by the mobile host to a DHCP Server (not shown) through its gateway and the response from the DHCP Server is returned through the same path.

The gateway router typically maintains the binding between the mobile host's MAC address and dynamically assigned IP address so as to minimize security breaches by another host who is taking over another host's dynamically assigned IP address. The gateway router maintains the bindings for a particular host in a DHCP Snooping database. When traffic comes from a particular MAC address that does not match the corresponding IP address for such binding, the gateway router determines that an attack or breach of security is in progress and does not allow such traffic to pass through the gateway to its destination.

Unfortunately DHCP Snooping currently may not work after a failover scenario. When the active gateway fails, the binding information is lost for its mobile hosts. Thus, security breaches may occur with the new active router since the new active router is not aware of valid MAC and IP address bindings for its hosts. This problem becomes more complex when different active routers handle different VLAN's since each active router is learning different DHCP bindings for its particular VLAN.

In view of the above, there is a need for mechanisms for consistently facilitating DHCP snooping, and other uses of DHCP binding data, in a redundant router group even after failure of an active router. Additionally, it would be desirable to facilitate DHCP snooping in a multiple VLAN environment.

SUMMARY OF THE INVENTION

Accordingly, the present invention includes mechanisms for facilitating the use of DHCP (dynamic host configuration protocol) binding data. In general, certain applications include mechanisms for intercepting data being sent from a node and then determining whether the data corresponds to a valid IP address and MAC address binding. Embodiments of the present invention provide mechanisms for sharing such DHCP binding data between routers (or other types of network devices or computer systems) in a redundancy group so that any of the routers may take over the data inspection to validate DHCP bindings. In particular aspects of the invention, the DHCP binding data is validated in procedures related to DHCP snooping, dynamic ARP (address resolution protocol) inspection, and the like.

In one embodiment, a method for facilitating DHCP (dynamic host configuration protocol) Snooping data is disclosed. The method includes the following operations: (a) at a first network device (e.g. router), receiving a request and a response that together include an internet protocol (IP) address and a media access control (MAC) address for a particular node; (b) at the first network device, storing a binding entry in a DHCP Snooping Database, wherein the stored binding entry includes the IP and MAC address for the particular node; and (c) sending at least a portion of the binding entry from the first network device to a second network device, wherein the first and second network device belong to a same redundancy group.

In a preferred implementation, the binding entry includes an indication that the binding entry was learned locally by the first network device and operation (c) is only performed for each DHCP Snooping Database binding entry that indicates it is locally learned. In a further aspect, operation (c) is periodically repeated. In yet a further aspect, operations (a) and (b) are repeated for a plurality of received pairs of a request and a response that each include an internet protocol (IP) address and a media access control (MAC) address for a particular node, and a plurality of binding entries are received into the first network device from the second network device, wherein the received binding entries include pairs of corresponding IP and MAC addresses for particular nodes and interface information for the particular nodes. At the first network device, each received binding entry is also stored in the DHCP Snooping Database along with an indication that the each received binding entry was not locally learned. Similarly binding entries learned on the first network device may be received into the second network device from the first network device. At the second network device too, each received binding entries may also be stored in the DHCP Snooping Database along with an indication that each received binding entry was not locally learned.

In another implementation, the first network device is in a different chassis than the second network device. In yet a further aspect, the DHCP Snooping Database is used for DHCP Snooping at the first network device. In another example, the DHCP Snooping Database is used for dynamic ARP (address resolution protocol) inspection, proxy-ARP inspection, or Reverse ARP-inspection at the first network device. In yet further examples, the DHCP Snooping Database is used for one or more of the following features: IP Source Guard (or MAC-IP binding enforcement), security enforcement with Private VLANs, security enforcement with Private Hosts, and IP unnumbered Interfaces.

In another aspect, operation (c) is repeated for a plurality of other network devices that belong to the same redundancy group as the first network device. In yet another implementation, operation (c) is triggered by the first network device receiving a request for DHCP binding entries from the second network device. In another aspect, sending the at least a portion of the binding entry from the first network device to a second network device is accomplished by determining that the second network device belongs to the same redundancy group by examining a HSRP (Hot Standby Router Protocol) or VRRP (Virtual Router Redundancy Protocol) or GLBP (Gateway Load Balancing Protocol) database associated with the first network device.

In another embodiment, the invention pertains to a computer system is operable to facilitate DHCP (dynamic host configuration protocol) Snooping data. The computer system includes one or more processors and one or more memory. The one or more processors and memory are configured for performing any combination of the above described method operations.

These and other features of the present invention will be presented in more detail in the following specification of the invention and the accompanying figures which illustrate by way of example the principles of the invention.

BRIEF DESCRIPTION OF THE DRAWINGS

FIGS. 5A-5B illustrate DHCP databases for the distribution routers of FIG. 3A in accordance with one embodiment of the present invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The following description includes examples of a redundant router group implementing Hot Standby Router Protocol (HSRP). However, embodiments of the present invention may be implemented using any suitable redundant router protocol, besides HSRP. By way of example, the Virtual Router Redundancy Protocol (VRRP) or GLBP (Gateway Load Balancing Protocol) may be used.

In general, the present invention provides techniques for facilitating the use of DHCP (dynamic host configuration protocol) binding data in a redundant router group, where the routers may reside in separate boxes or chassis. The redundant router group may include any suitable number and type of routers configured to communicate with each other and provide backup for the group while also providing routing capabilities for a plurality of hosts in the same or different virtual local area networks (VLAN's). The techniques of the present invention may facilitate any suitable use of a DHCP Snooping Database, such as DHCP Snooping, IP Source Guard, Dynamic ARP Inspection (DAI), security enforcement with Private VLANs, security enforcement with Private Hosts, IP unnumbered interfaces, etc.

Figure 1:
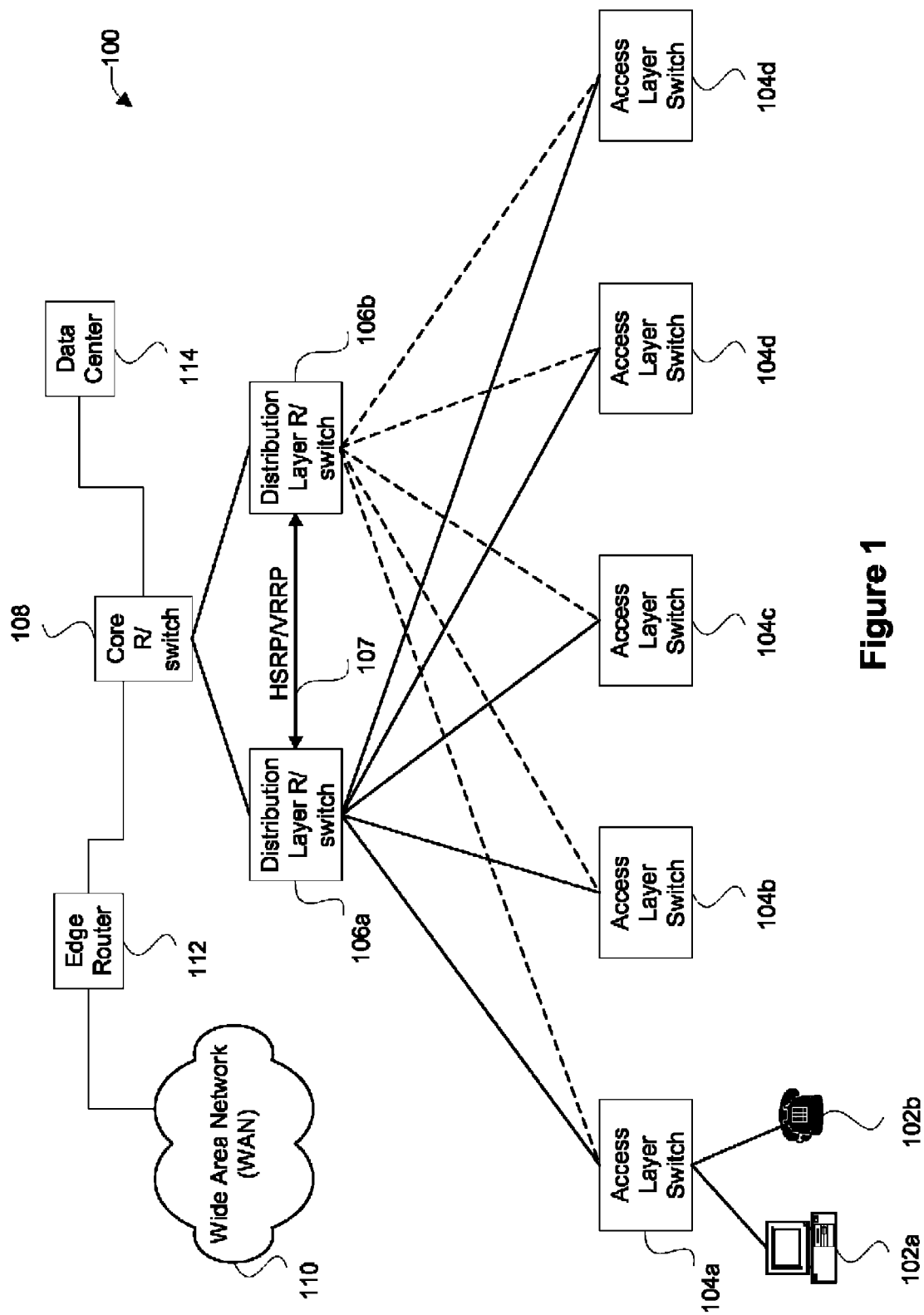
FIG. 1 is a diagrammatic representation of an example enterprise system.
Figure 2:
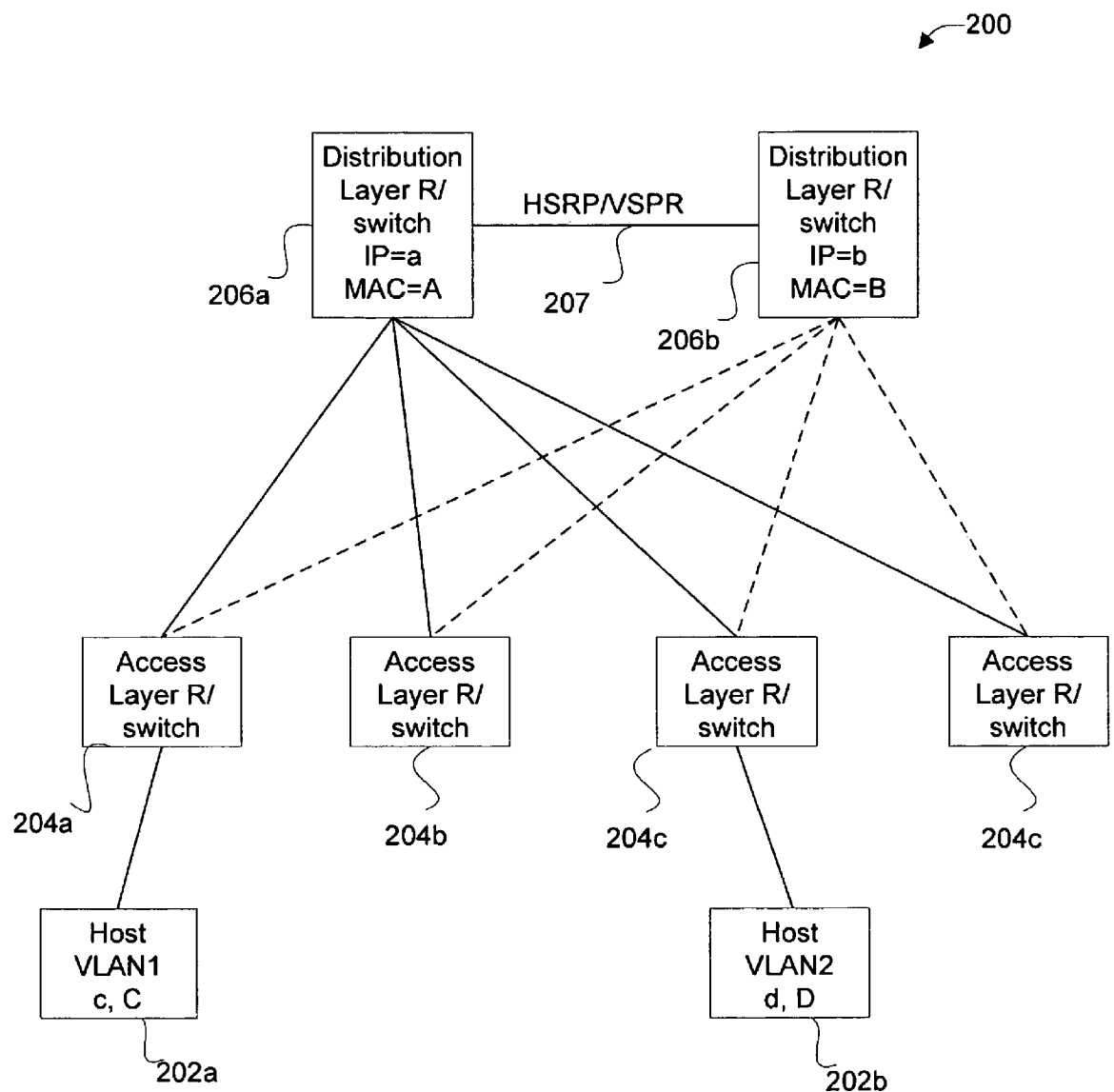
FIG. 2 represents a network segment in which a first host in a first VLAN (virtual local area network) is used to communicate with a second host in a second VLAN.
Figure 3A:
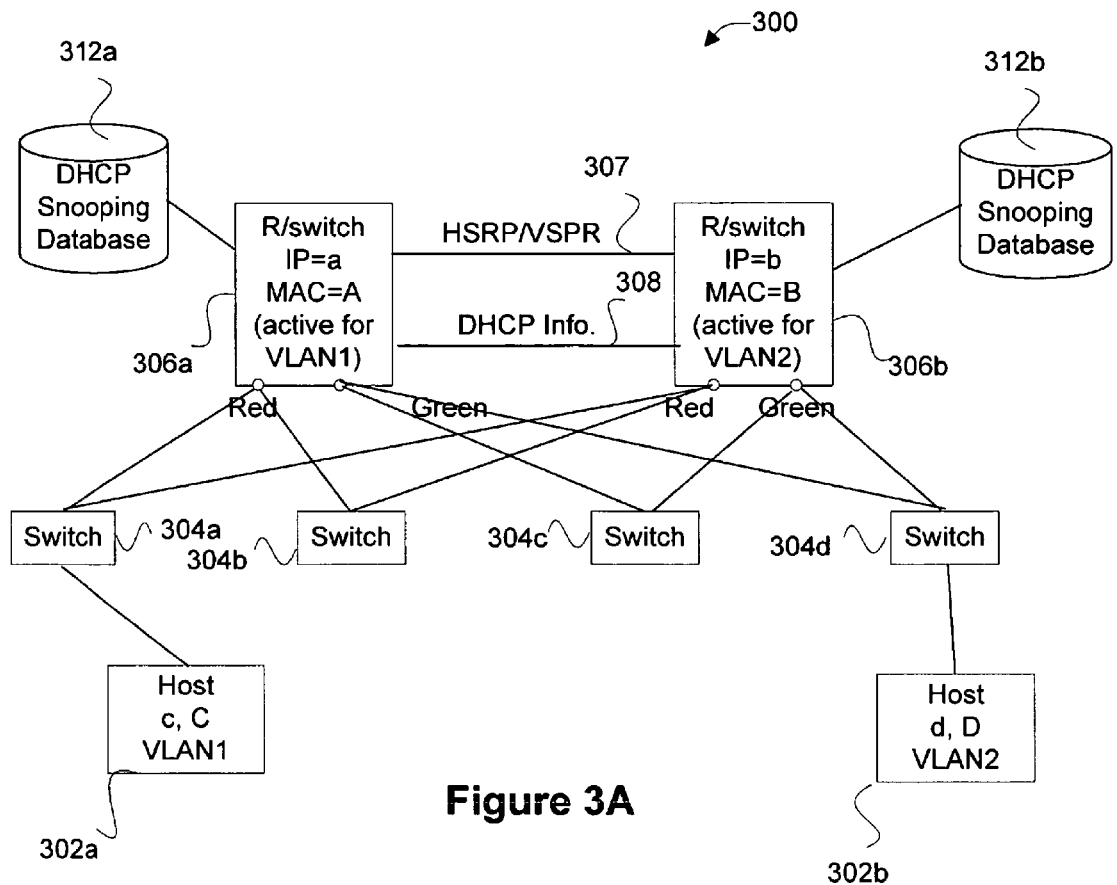
FIG. 3A is a diagrammatic representation of an example network segment in which embodiments of the present invention may be implemented.

FIG. 3A is a diagrammatic representation of an example network segment 300 in which embodiments of the present invention may be implemented. In this arrangement, the distribution layer includes two or more distribution routers 306. A plurality of hosts 302 are coupled through access switches 304 to each of the two or more distribution routers 306. The distribution routers 306 form a redundancy group and this redundancy group may be utilized by one or more VLAN's. For example, host 302a belongs to a first VLAN 1, and router 306a serves as the active router for VLAN 1. In contrast, host 302b belongs to a second VLAN 2, and router 306b serves as the active router for VLAN 2. Each router 306 may also have a plurality of interfaces, and each interface may support one or more VLAN's. As shown, router 306a has an interface identified as "red" that supports VLAN 1 devices and an interface "green" that supports VLAN 2 devices. Router 306b has both "red" and "green" interfaces.

Figure 3B:
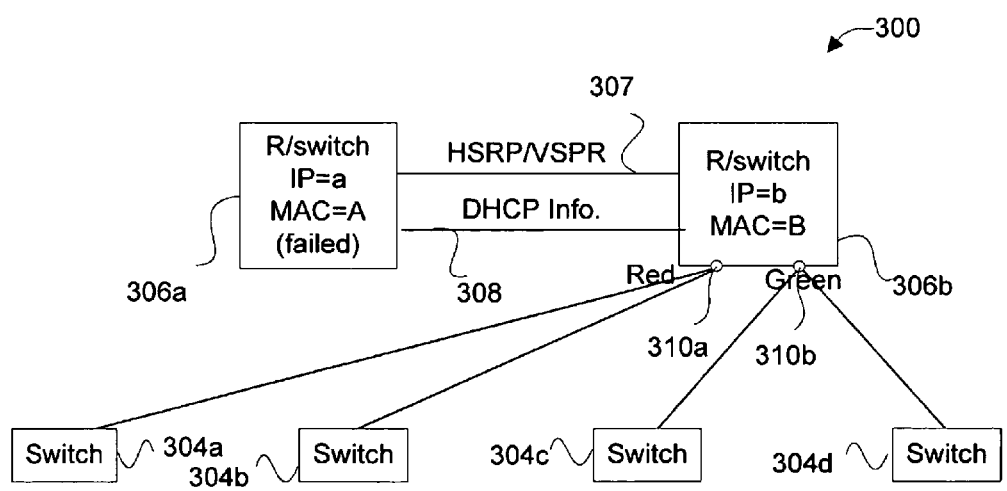
FIG. 3B illustrates a failing router and the switchover of its devices to the standby router.

When a router in the redundancy router group fails, another router in such group takes over for the failed router. In the illustrated example, router 306a is currently active for VLAN 1 devices, and router 306b serves as a standby for these VLAN 1 devices when router 306a fails. FIG. 3B illustrates a failing router 306a and the switchover of its devices to the standby router 306a. In this example, router 306b is active for both VLAN 1 and VLAN 2.

In this example, both distribution routers 306 maintain their own DHCP Snooping Databases 312. Thus, router 306a will maintain DHCP Snooping Database 312a for its active hosts, e.g., host 302a, and router 306b will maintain DHCP Snooping Database 312b for its active hosts, e.g., host 302b. Each DHCP Snooping Database may include one or more physical storage devices that are located at the same location or different physical locations.

Figure 4A:
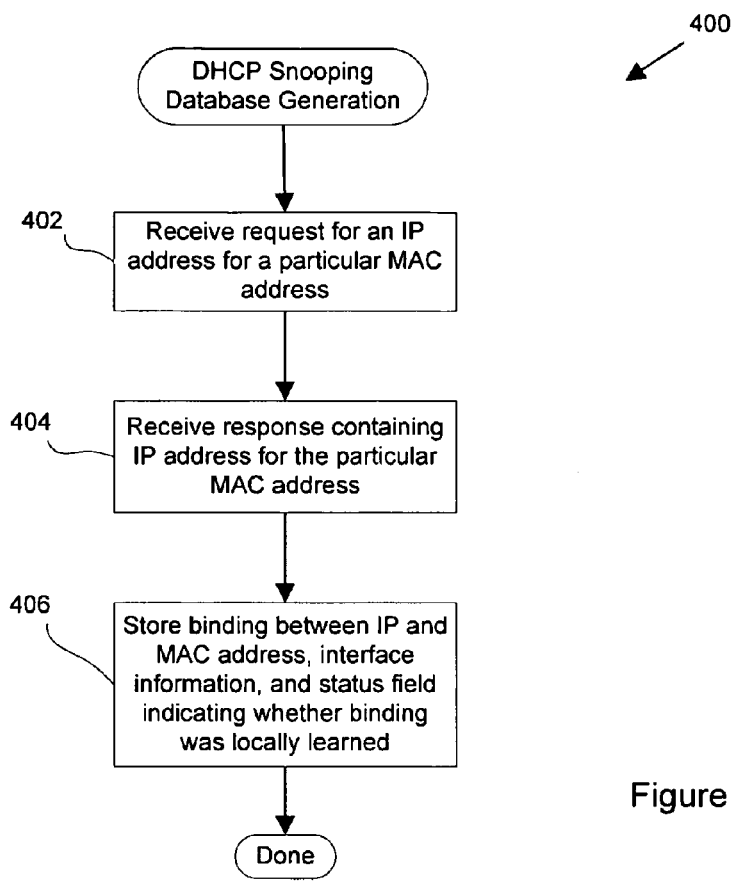
FIG. 4A is a flow chart illustrating a procedure for generating a DHCP Snooping Database in a router in accordance with one embodiment of the present invention.
Figure 4B:
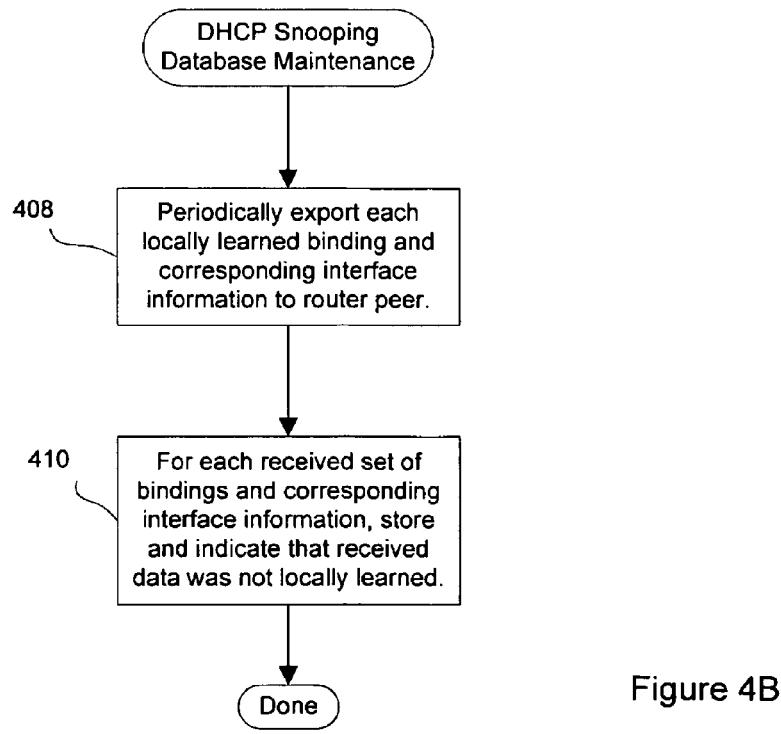
FIG. 4B is a flow chart illustrating a procedure for maintaining a DHCP Snooping Database in a router in accordance with one embodiment of the present invention.

Embodiments of the present invention provide mechanisms for sharing DHCP information between routers in a redundancy group. FIG. 4A is a flow chart illustrating a procedure for generating a DHCP Snooping Database in a router and FIG. 4B is a flowchart illustrating a procedure for maintaining a DHCP Snooping Database in a router, in accordance with one embodiment of the present invention. In order to generate a DHCP Snooping Database in a particular router, a request for an IP address for a particular MAC address is received into the particular router in operation 402. The particular router then receives a response containing the IP address for the particular MAC address in operation 404. The request for an IP address may be for the requesting node or another node. In alternative embodiments, a request may be made for a MAC address for a particular IP address with respect to a particular host.

In one example, host 302a of FIG. 3A may be in the form of a mobile laptop that is being coupled to VLAN 1 via switch 304a and distribution layer router 306a. To obtain an IP address that is suitable for VLAN 1, host 302a may request an IP address for its MAC address "C", and this request is sent to a DHCP Server (not shown) via router 306a. The DHCP Server selects an IP address, such as "c", from its IP address pool to lease or assign to host 302a and sends a response that includes both the assigned IP address and MAC address for the requesting host 302a. This response is seen by router 306a as it is sent from the DHCP Server to the requesting host 302a.

The binding between the IP address and corresponding MAC address is then stored in a DHCP Snooping Database along with interface information and a status field indicating whether the binding was locally learned in operation 406. The DHCP Snooping Database binding entry also typically includes other standard DHCP Snooping Table fields, such as VLAN number, binding type, and age information.

FIG. 5A illustrates a DHCP Snooping Database for router 306a of FIG. 3A and FIG. 5B illustrates a DHCP Snooping Database for router 306b in accordance with one embodiment of the present invention. Each database entry includes an IP address field 502, a corresponding MAC address field 504, an interface identifier 506, an indicator 508 as to whether the binding was locally learned, and an age field 510. Each DHCP entry also typically includes VLAN number and binding type field (not shown).

As shown in FIG. 5A, the DHCP Snooping Database 500a of router 506a contains a first binding entry 510a having an assigned IP address "c" and corresponding MAC address "C" for host 302a, an identifier "red" for the interface of host 302a, and an indication that this binding was locally learned by router 306a. Likewise in FIG. 5B, the DHCP Snooping Database 500b of router 506b contains a binding entry 512b having an assigned IP address "d" and corresponding MAC address "D" for host 302b, an identifier "green" for the interface of host 302b, and an indication that this binding was locally learned by router 306b.

Referring FIG. 4B, the DHCP Snooping Database of each router may be maintained by periodically exporting each locally learned binding and corresponding interface information to its router peer(s) in operation 408. The exporting of DHCP Snooping binding information may be initiated by either the sending or the receiving router. In an alternative implementation, when a switchover is occurring or imminent, the binding information is sent once by the failing router (or grabbed by the router that is taking over the active role). However, the former embodiment of periodically sending this binding information prior to a switchover will likely be more reliable since each router in the redundancy group is more likely to obtain the necessary DHCP binding information in periodic updates prior to complete shut down of the failing router.

The locally learned binding data may be sent from a first router to one or more peer routers using any suitable mechanism. For example, each router can be configured with the each peer router address, or multicasting can be set up for a router group so that they learn about their peers. Alternatively, the addresses of peer router(s) may be obtained from the router's HSRP, VRRP or GLBP database. As each router in a redundancy group comes up, it is configured as belonging to the particular redundancy group and informs the routers around it that it belongs to such group. Then the routers in the same redundancy group exchange information to determine which is active, etc. These HSRP, VRRP or GLBP mechanisms result in an HSRP, VRRP or GLBP database for each router that lists all of its peers routers and their addresses, and this information may be easily looked up for determining where to send the locally learned binding information.

Since each active router is sending its locally learned binding information to its peers, each received set of binding and corresponding interface information is stored, along with an indication that such binding were not locally learned, in operation 410. Thus, the DHCP Snooping Database 500a of router 306a contains a binding entry 512a received from router 306b, and this entry contains an assigned IP address "d" and corresponding MAC address "D" for host 302b, an identifier "green" for the interface of host 302b, and an indication that this entry 512a was not locally learned by router 306a, but rather remotely learned by router 306b and sent from router 306b to router 306a. Likewise, the DHCP Snooping Database 500b of router 306b contains a binding entry 510b received from router 306a, and this entry contains an assigned IP address "c" and corresponding MAC address "C" for host 302a, an identifier "red" for the interface of host 302a, and an indication that this entry 510b was not locally learned by router 306b, but rather remotely learned by router 306a and sent from router 306a to router 306b.

As shown, each binding entry may also have an age field 510. This age field may be used to determine whether the binding has timed out or been relinquished by the corresponding host. In one implementation, the age field indicates the amount of time that has passed since the last response from the corresponding host. In this example, a binding entry is determined to be timed out when the time is greater than a predefined value. In another implementation, the age field may indicate a timer value that is updated with each corresponding host response. In this case, the binding is aged out when the timer has timed out. In either implementation, the aged binding entries may be removed from each DHCP Snooping Database.

The above described mechanisms for maintaining a DHCP database in each router of a redundancy group works for routers that have separate boxes and do not have the use of backplane signals for communicating state information. In the simplest implementation, the active router simply sends a custom packet to inform the one or more standby router(s) in its peer group about updates to its DHCP Snooping database. One example of such a packet (but not limited to) would be UDP. In the above described implementations, only locally learned binding data is sent.

Once each peer has the complete DHCP Snooping Database for the entire peer group, this DHCP information may be used for any suitable purpose. In DHCP Snooping, the distribution router ensures that each host has a valid IP address and MAC address by comparing them to the bindings in the DHCP Snooping database.

In another use, the DHCP Snooping Database may be used for dynamic ARP (address resolution protocol) inspection (DAI) or proxy-ARP or reverse ARP. DAI and its permutations provide a way for a host to obtain the MAC address of another host (e.g., host 302a wants to know the MAC address for host 302b). By way of example, host 302a requests the MAC address of IP address "d" which belongs to host 302b. To prevent an illegal host from responding with an invalid MAC address (e.g., "F") for an ARP request having IP address "d", an intercepting router/switch may check their DHCP Snooping table to ensure that the responding MAC and IP address corresponds to a valid binding.

The IP Source Guard feature essentially does the IP Address to MAC address binding enforcement via use of the DHCP Snooping Table. A security violation occurs when a secure IP address associated with one MAC address is used by a different MAC address.

The "Private Hosts" feature may use the DHCP Snooping Table for Broadband aggregation (e.g., DSLAM) security. For VLAN scalability many residential users will be sharing the same VLAN. The CPE (customer premise equipment) will have the ability to map each service to a different VLAN. When a router is used as the DSLAM aggregator in the distribution layer, several issues arise. For example, each VC is mapped to a VLAN and there could be multiple VCs terminating on the same DSLAM. DSLAM might have different VCs for each service: voice, data, video, etc. The QinQ mechanism can be used to address this issue. In another issue, each device attached to a DSL line can correspond to one MAC address. In another issue, residential users connected to different DSLAMs, although in the same L2 domain, should not have direct L2 connectivity. There should be some mechanism to provide L2 isolation for these users across the DSLAMs. In another issue, the goal is to prevent one subscriber from masquerading as another, especially by spoofing the upstream devices' (e.g., BRAS server) MAC address. Embodiments of the present invention provide a solution for the above issues like L2 isolation across multiple trunk ports, VLAN scalability/reusability and spoofing protection.

Another feature that uses DHCP Snooping database is the "IP Unnumbered SVIs" feature. The advent of Ethernet DSLAMs and their ongoing adoption by DSL Service Providers introduces a new set of requirements for aggregation devices. These DSLAMs differ from traditional ATM DSLAMs in that they're equipped with Gigabit Ethernet or 100BaseT up links instead of legacy ATM uplinks. Hence, the devices aggregating traffic from these DSLAMs should be Ethernet (or multilayer) switches. Service Providers are requesting support of IP Unnumbered Ethernet-type interfaces of these aggregation switches for the following reasons:

Allow better utilization of IP address pools across multiple interfaces.

Allow for DHCP to delegate different address ranges in the same subnet in support of different applications such as Set Top Boxes that may require a private IP address and Internet Access where a public address is required, even though both devices reside on the same VLAN.

Allow for easier configuration of aggregation switches, especially on smaller Ethernet switches where each interface may be dedicated to a subscriber.

When considering aggregation of Ethernet DSLAMs, two operational modes come into the picture: (1) A subscriber is mapped to a single VLAN, and (2) multiple subscribers are mapped to the same VLAN. Therefore, satisfying the request of supporting IP Unnumbered for these scenarios translates to extending the command to apply to non-point-to-point media.

Generally, techniques of the present invention may be implemented in any suitable combination of software and/or hardware. For example, these techniques can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured multi-layer switches or routers such as Catalyst 3500/3700s, 4500s and 6500s, Cisco 7600s and 12000s, etc. available from Cisco Systems, Inc. of San Jose, Calif. A general architecture for some of these machines will appear from the description given below. In an alternative embodiment, the system may be implemented on a general-purpose network host machine such as a personal computer or workstation. Further, the invention may be at least partially implemented on a card (for example, an interface card) for a network device or a general-purpose computing device.

Figure 6:
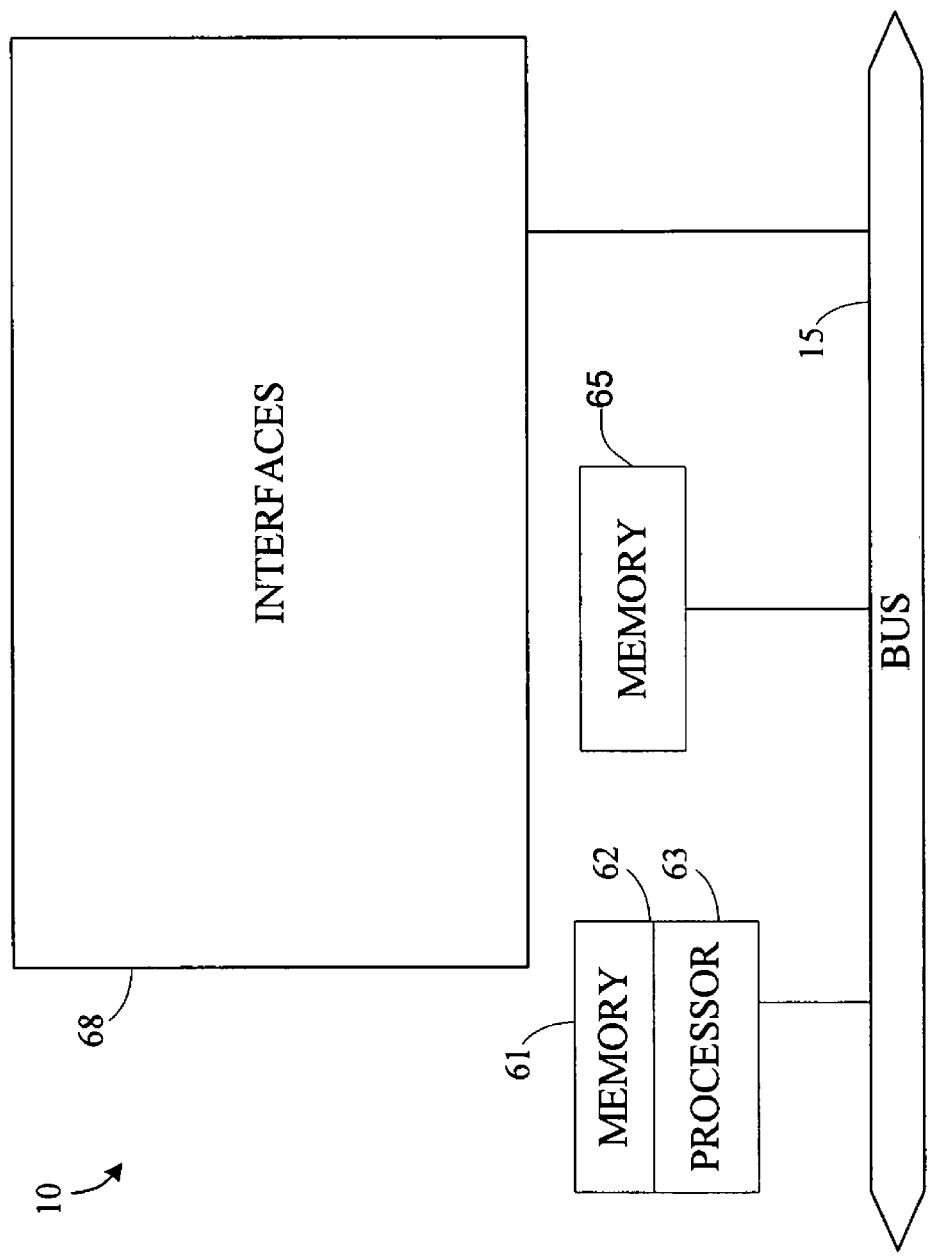
FIG. 6 is a block diagram of a router that may be used to implement embodiments of this invention.

Referring now to FIG. 6, a router 10 suitable for implementing embodiments of the present invention includes a master central processing unit (CPU) 62, interfaces 68, and a bus 15 (for example, a PCI bus). When acting under the control of appropriate software or firmware, the CPU 62 is responsible for such router tasks as routing table computations and network management. It may also be responsible for calculating a route metric and/or comparing two route metrics to determine which has higher priority. It preferably accomplishes all these functions under the control of software including an operating system (for example, the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many other ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of a network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store a DHCP Snooping Database, received packets, identifiers to track each flow and the number of such flows, VLAN associations, states of each interfaces, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For example, all binding information may be periodically or singly sent by the active router to its peers, whether or not they are locally learned. Therefore, the described embodiments should be taken as illustrative and not restrictive, and the invention should not be limited to the details given herein but should be defined by the following claims and their full scope of equivalents.

What is claimed is:

1. A method comprising:
   (a) at a first network device, receiving a request from a particular node to be assigned an IP address for a media access control (MAC) address of such particular node and receiving, in response to such request, a response from a dynamic host configuration protocol (DHCP) server, wherein the response has an internet protocol (IP) address that is assigned to the MAC address of the particular node;
   (b) at the first network device, storing a binding entry in a DHCP Snooping Database, wherein the stored binding entry associates the IP address and the MAC address for the particular node, wherein each entry of the DHCP Snooping Database corresponds to a valid IP address that is assigned to a particular MAC address and wherein the first network device is configured to intercept data and determine whether such intercepted data contains a valid IP address that is assigned to a particular MAC address based on the DHCP Snooping Database of the first network device; and (c) sending at least a portion of the binding entry, including the associated IP and MAC address for the particular node, from the DHCP Snooping Database of the first network device to a second network device for the second network device to store such binding entry in a corresponding DHCP Snooping Database of the second network device, wherein the first and second network device belong to a same redundancy network device group and the second network device is configured to intercept data and determine whether the intercepted data contains a valid IP address that is assigned to a particular MAC address based on the corresponding DHCP Snooping Database of the second network device.

2. A method as recited in claim 1, wherein the binding entry includes an indication that the binding entry was learned locally by the first network device and operation (c) is only performed for each DHCP Snooping Database binding entry that indicates it is locally learned.

3. A method as recited in claim 2, wherein operation (c) is periodically repeated.

4. A method as recited in claim 3, further comprising:
repeating operations (a) and (b) for a plurality of received pairs of a request and a response that each include an internet protocol (IP) address and a media access control (MAC) address for a particular node;
receiving a plurality of binding entries into the first network device from the second network device, wherein the received binding entries include pairs of corresponding IP and MAC addresses for particular nodes and interface information for the particular nodes; and
at the first network device, storing each received binding entries in the DHCP Snooping Database along with an indication that the each received binding entry was not locally learned.

5. A method as recited in claim 4, wherein the first network device is in a different chassis than the second network device.

6. A method as recited in claim 4, further comprising using the DHCP Snooping Database for DHCP Snooping at the first network device.

7. A method as recited in claim 4, further comprising using the DHCP Snooping Database for dynamic ARP (address resolution protocol) inspection, proxy-ARP inspection, or reverse ARP-inspection at the first network device.

8. A method as recited in claim 4, further comprising using the DHCP Snooping Database for IP Source Guard (or MAC-IP binding enforcement), security enforcement with Private VLANs, security enforcement with Private Hosts, or IP unnumbered interfaces.

9. A method as recited in claim 4, further comprising performing operation (c) for a plurality of other network devices that belong to the same redundancy network device group as the first network device.

10. A method as recited in claim 1, wherein operation (c) is triggered by the first network device receiving a request for DHCP binding entries from the second network device.

11. A method as recited in claim 1, wherein sending the at least a portion of the binding entry from the first network device to a second network device is accomplished by determining that the second network device belongs to the same redundancy group by examining a HSRP (Hot Standby Router Protocol) or VRRP (Virtual Router Redundancy Protocol) or GLBP (Gateway Load Balancing Protocol) database associated with the first network device.

12. A computer system in the form of a first network device, comprising:
one or more processors;
one or more memory, wherein at least one of the processors and memory are configured for:
(a) at the first network device, receiving a request from a particular node to be assigned an IP address for a media access control (MAC) address of such particular node and receiving, in response to such request, a response from a dynamic host configuration protocol (DHCP) server, wherein the response has an internet protocol (IP) address that is assigned to the MAC address of the particular node;
(b) at the first network device, storing a binding entry in a DHCP Snooping Database, wherein the stored binding entry associates the IP address and the MAC address for the particular node, wherein each entry of the DHCP Snooping Database corresponds to a valid IP address that is assigned to a particular MAC address and wherein the first network device is configured to intercept data and determine whether such intercepted data contains a valid IP address that is assigned to a particular MAC address based on the DHCP Snooping Database of the first network device; and
(c) sending at least a portion of the binding entry, including the associated IP and MAC address for the particular node, from the DHCP Snooping Database of the first network device to a second network device for the second network device to store such binding entry in a corresponding DHCP Snooping Database of the second network device, wherein the first and second network device belong to a same redundancy network device group and the second network device is configured to intercept data and determine whether the intercepted data contains a valid IP address that is assigned to a particular MAC address based on the corresponding DHCP Snooping Database of the second network device.

13. A computer system as recited in claim 12, wherein the binding entry includes an indication that the binding entry was learned locally by the first network device and operation (c) is only performed for each DHCP Snooping Database binding entry that indicates it is locally learned.

14. A computer system as recited in claim 13, wherein operation (c) is periodically repeated.

15. A computer system as recited in claim 14, wherein at least one of the processors and memory are further configured for:
repeating operations (a) and (b) for a plurality of received pairs of a request and a response that each include an internet protocol (IP) address and a media access control (MAC) address for a particular node;
receiving a plurality of binding entries into the first network device from the second network device, wherein the received binding entries include pairs of corresponding IP and MAC addresses for particular nodes and interface information for the particular nodes; and
at the first network device, storing each received binding entries in the DHCP Snooping Database along with an indication that the each received binding entry was not locally learned.

16. A computer system as recited in claim 15, wherein the first network device is in a different chassis than the second network device.

17. A computer system as recited in claim 15, wherein at least one of the processors and memory are further configured for using the DHCP Snooping Database for DHCP Snooping at the first network device.

18. A computer system as recited in claim 15, wherein at least one of the processors and memory are further configured for using the DHCP Snooping Database for dynamic ARP (address resolution protocol) inspection, proxy-ARP inspection, or reverse ARP-inspection at the first network device.

19. A computer system as recited in claim 15, wherein at least one of the processors and memory are further configured for using the DHCP Snooping Database for IP Source Guard (or MAC-IP binding enforcement), security enforcement with Private VLANs, security enforcement with Private Hosts, or IP unnumbered interfaces.

20. A computer system as recited in claim 15, wherein at least one of the processors and memory are further configured for performing operating (c) for a plurality of other network devices that belong to the same redundancy group as the first network device.

21. A computer system as recited in claim 12, wherein operation (c) is triggered by the first network device receiving a request for DHCP binding entries from the second network device.

22. A computer system as recited in claim 12, wherein sending the at least a portion of the binding entry from the first network device to a second network device is accomplished by determining that the second network device belongs to the same redundancy group by examining a HSRP (Hot Standby Router Protocol) or VRRP (Virtual Standby Router Protocol) or GLBP (Gateway Load Balancing Protocol) database associated with the first network device.

23. An apparatus in the form of a first network device, comprising:
means for at the first network device, receiving a request from a particular node to be assigned an IP address for a media access control (MAC) address of such particular node and receiving, in response to such request, a response from a dynamic host configuration protocol (DHCP) server, wherein the response has an internet protocol (IP) address that is assigned to the MAC address of the particular node;
means for at the first network device, storing a binding entry in a DHCP Snooping Database, wherein the stored binding entry associates the IP address and the MAC address for the particular node, wherein each entry of the DHCP Snooping Database corresponds to a valid IP address that is assigned to a particular MAC address and wherein the first network device is configured to intercept data and determine whether such intercepted data contains a valid IP address that is assigned to a particular MAC address based on the DHCP Snooping Database of the first network device; and
means for sending at least a portion of the binding entry, including the associated IP and MAC address for the particular node, from the DHCP Snooping Database of the first network device to a second network device for the second network device to store such binding entry in a corresponding DHCP Snooping Database of the second network device, wherein the first and second network device belong to a same redundancy network device group and the second network device is configured to intercept data and determine whether the intercepted data contains a valid IP address that is assigned to a particular MAC address based on the corresponding DHCP Snooping Database of the second network device.

24. A network segment comprising:
a plurality of hosts;
a plurality of access layer switches that are each coupled to one or more of the hosts;
a plurality of distribution network devices, wherein all of the access layer switches are coupled to all of the distribution network devices; and
wherein each of the distribution network devices are configured for:
receiving a request from a particular one of the hosts to be assigned an IP address for a media access control (MAC) address of such particular host and receiving, in response to such request, a response from a dynamic host configuration protocol (DHCP) server, wherein the response has an internet protocol (IP) address that is assigned to the MAC address of the particular host;
storing a binding entry in a DHCP Snooping Database, wherein the stored binding entry associates the IP address the MAC address for the particular host, wherein each entry of the DHCP Snooping Database corresponds to a valid IP address that is assigned to a particular MAC address and wherein each entry can be matched to intercepted data so as to determine whether such intercepted data contains a valid IP address that is assigned to a particular MAC address;
sending at least a portion of the binding entry, including the associated IP and MAC address for the particular host, from the DHCP Snooping Database of the each distribution network device to the other one or more distribution network devices for the other one or more distribution network devices to store such binding entry in a corresponding DHCP Snooping Database of the other distribution network devices, wherein the distribution network devices belong to a same redundancy network device group; and
intercepting data and determining whether the intercepted data contains a valid IP address that is assigned to a particular MAC address based on the corresponding DHCP Snooping Database of the each distribution network device.

* * * * *